US006987165B2

(12) United States Patent
Auer et al.

(10) Patent No.: US 6,987,165 B2
(45) Date of Patent: Jan. 17, 2006

(54) METHOD FOR PRODUCING HIGHLY REACTIVE POLYISOBUTENES

(75) Inventors: Heinz Auer, Neulussheim (DE); Ulrich Kanne, Maxdorf (DE); Andre De Vos, Grobbendonk (BE)

(73) Assignee: BASF Aktiengesellschaft, Ludwigshafen (DE)

( * ) Notice: Subject to any disclaimer, the term of this patent is extended or adjusted under 35 U.S.C. 154(b) by 302 days.

(21) Appl. No.: 10/451,743

(22) PCT Filed: Jan. 7, 2002

(86) PCT No.: PCT/EP02/00065

§ 371 (c)(1),
(2), (4) Date: Jun. 25, 2003

(87) PCT Pub. No.: WO02/053601

PCT Pub. Date: Jul. 11, 2002

(65) Prior Publication Data

US 2004/0039141 A1 Feb. 26, 2004

(30) Foreign Application Priority Data

Jan. 8, 2001 (DE) ............................... 101 00 440

(51) Int. Cl.
*C08F 6/06* (2006.01)
(52) U.S. Cl. ..................................... 528/499; 526/237
(58) Field of Classification Search ................ 526/237; 528/499
See application file for complete search history.

(56) References Cited

U.S. PATENT DOCUMENTS

| 4,940,833 | A | | 7/1990 | Drake et al. |
| 5,286,823 | A | * | 2/1994 | Rath ........................... 526/237 |
| 5,408,018 | A | | 4/1995 | Rath |
| 6,518,373 | B1 | | 2/2003 | Sandrock et al. |

FOREIGN PATENT DOCUMENTS

| EP | 969 026 | 1/2000 |
| WO | 99/31151 | 6/1999 |

OTHER PUBLICATIONS

Derwent Abst. 2002-291794/33.
Chem.Abst. vol. 136,No. 3, 2002, p. 859.
Derwent Abst. 2001-293133/30.
JP 7 96713 English Translation.

* cited by examiner

Primary Examiner—Fred Teskin
(74) Attorney, Agent, or Firm—Novak Druce & Quigg; Jason D. Voight

(57) ABSTRACT

A process for the preparation of highly reactive polyisobutenes is described, in which isobutene is polymerized in the presence of a complex of boron trifluoride and at least one cocatalyst in a liquid organic phase at a reaction temperature of from −60 to −4° C. and water is added in two stages to the organic phase for catalyst deactivation and catalyst extraction.

8 Claims, No Drawings

METHOD FOR PRODUCING HIGHLY REACTIVE POLYISOBUTENES

The present invention relates to a process for the preparation of highly reactive polyisobutenes.

The highly reactive polyisobutenes discussed are those which have a high content of, preferably, more than 60 mol % of terminal vinylidene groups. Highly reactive polisobutenes are desirable intermediates for the production of additives for lubricants and fuels.

Such highly reactive polyisobutenes are obtainable, for example, by the process of EP 0 628 575, by cationic polymerization of isobutene in the liquid phase with the aid of boron trifluoride and a secondary alcohol at from 0 to −60° C.

The prior Patent Applications DE 199 48 947.5, DE 199 52 031.3, DE 199 52 030.5, DE 100 28 585.6 and DE 100 35 298.7 relate to improvements or advantageous embodiments of such a process.

After reaching the desired molecular weight, the polymerization catalyst is deactivated and the polymerization is stopped in this manner. EP 0 628 575 recommends for this purpose passing the reaction discharge into a medium, such as water, an alcohol, acetonitrile, ammonia or an aqueous solution of a mineral base, such as an alkali metal or alkaline earth metal hydroxide solution or a solution of a carbonate of one of these metals.

For the preparation of highly reactive polyisobutenes, it is critical that the polymerization catalyst is deactivated as rapidly and quantitatively as possible after the desired molecular weight has been reached, in order to prevent isomerization reactions giving polyisobutene molecules in which the double bond assumes a thermodynamically more favorable position in the interior of the molecule.

Organic chain-terminating agents, such as acetonitrile and alcohols, have the advantage that they are miscible with the organic reaction phase and can therefore be readily and uniformly distributed in said phase. However, they have the disadvantage that their affinity to the $BF_3$ molecule is comparatively low and they therefore lead only to gradual catalyst deactivation. Since they can also act as phase mediators, they complicate the subsequent extraction with water for removal of the catalyst deactivation products.

Aqueous chain-terminating agents, in particular water itself, have the advantage that the catalyst deactivation and removal of the catalyst deactivation or hydrolysis products by extraction can take place simultaneously. The disadvantage however is that the aqueous phase is immiscible with the organic reaction phase and the catalyst deactivation can take place only at the phase boundary. In continuous regions of the organic reaction phase, the polymerization reaction can still continue or undesired isomerizations can take place after the organic reaction phase has been brought into contact with an aqueous chain-terminating agent.

JP-A 7196724 discloses a process for removing a Lewis acid catalyst, used for carrying out a cationic polymerization, from the organic reaction phase, in which the reaction phase is treated with water or acidified water and separation into a polymer-containing organic phase and an aqueous phase containing the dissolved catalyst is effected. The water or acidified water is preferably preheated in order to promote the removal of the catalyst. The amount of water or acidified water is at least 5, preferably at least 20, in particular at least 40, % by volume, based on the reaction phase. The preparation of highly reactive polyisobutenes is not discussed.

U.S. Pat. No. 4,940,833 describes a process for working up a liquid polymerization reaction mixture which contains olefin monomer, catalyst residues and catalyst deactivation products, in which the mixture is washed with water and the organic and aqueous phase are then separated. Oxygen-containing compounds, such as alcohols, dicarbonyl compounds and/or alkylene oxides, are mentioned as preferred catalyst deactivators, methanol being most preferred.

It is an object of the present invention to provide a process for the preparation of highly reactive polyisobutenes which permits rapid and substantially quantitative catalyst deactivation and simple extraction of the catalyst deactivation products.

We have found that this object is achieved, according to the invention, by a process for the preparation of highly reactive polyisobutenes, in which a) isobutene is polymerized in the presence of a complex of boron trifluoride and at least one cocatalyst in a liquid organic phase at a reaction temperature of from −60 to −4° C., b) the organic phase which is substantially at the reaction temperature is brought into intimate contact with a first portion of water whose temperature is at least 80° C., preferably at least 90° C., above the reaction temperature, with formation of an emulsion which contains finely dispersed water droplets in the organic phase, c) a second portion of water is added to the emulsion with formation of a continuous, predominantly organic phase and a continuous, predominantly aqueous phase, and d) the organic phase is separated from the aqueous phase.

The present invention is based on the finding that, for the substantially quantitative extraction of the boron trifluoride cocatalyst complex or of the hydrolysis products thereof from the organic reaction phase, the amount of aqueous phase may not fall below a minimum amount, based on the organic reaction phase. If, however, the organic reaction phase and an amount of aqueous phase which corresponds to the required minimum amount or is greater than this are brought into contact, it is found that the phases have a considerable tendency to phase separation with the formation of a continuous organic phase and a continuous aqueous phase. This situation makes it more difficult to disperse the aqueous phase finely in the organic reaction phase, which dispersing is necessary for achieving rapid, quantitative and uniform catalyst deactivation. In an attempt to carry out the catalyst deactivation using a smaller amount of water, it was found that contact of the aqueous phase with the reaction phase, which has a temperature below the freezing point of water, can result in the formation of ice crystals which lead to blockage of pipelines and/or valves and do not permit satisfactory catalyst deactivation.

The novel process avoids all of the problems described above. In particular, it is surprising that no undesirable isomerization reactions occur when the reaction phase is brought into contact with the first portion of water whose temperature is at least 80° C. above the reaction temperature.

Preferably, the sum of the first and second portions of water is from 5 to 100, in particular from 20 to 90, % by weight, based on the weight of the organic phase. The weight ratio of the first portion to the second portion is preferably from 1:10 to 10:1, in particular from 1:5 to 5:1, particularly preferably from 1:5 to 1:1.5.

Preferably, the emulsion obtained by bringing the organic phase into contact with the first portion of water has a mixing temperature of from +5 to +50° C., in particular from +10 to +45° C.

The first and/or second portions of water can contain dissolved substances, such as mineral bases, e.g. alkali metal or alkaline earth metal hydroxides or carbonates, ammonia or acids, such as hydrochloric acid, etc. Since, however, no further advantage is generally associated therewith, the first and second portions of water preferably contain no significant amounts of dissolved substances. Tap water or river water is suitable. In general, however, demineralized water is preferred. The pH of the first and second portions of water is in general from 6 to 10.

The novel process is suitable for the preparation of polyisobutenes having a number average molecular weight of from 500 to 5 000 and is particularly suitable for the preparation of polyisobutenes having a number average molecular weight of from 1 800 to 5 000. The polymerization in step a) of the novel process is therefore preferably carried out in such a way that polyisobutene molecules having a number average molecular weight of from 1 800 to 5 000 are obtained.

At the time of being brought into contact with the first portion of water, the organic phase is substantially at the reaction temperature, i.e. it is not significantly heated after reaching the desired degree of polymerization before the catalyst is deactivated by adding the first portion of water.

The first portion of water is preferably added by means of a nozzle into a pipeline through which the organic reaction phase is passed. The outlet orifice of the nozzle is preferably arranged in the direction of flow of the organic phase. The formation of the emulsion is assisted if the stream of the organic phase in the region of the addition of the first portion of water has turbulent flow. Measures for generating turbulent flows are known to a person skilled in the art. The first portion of water typically has a temperature of from 80 to 160° C. Temperatures of more than 100° C. necessitate keeping the water under a pressure which is higher than ambient pressure.

The addition of the second portion of water can likewise advantageously be effected via a nozzle into the stream of the emulsion obtained by bringing the organic phase into contact with the first portion of water. The nozzle for adding the second portion of water is then arranged a distance downstream of the nozzle via which the first portion of water is added. A suitable spacing between the nozzles can readily be determined by a person skilled in the art by means of simple experiments. The optimum spacing is as a rule dependent on the flow rate of the organic phase. As a rule, it is such that a time span of from 2 to 1 000, in particular from 2 to 200, seconds elapses from the bringing of a volume element of the organic phase into contact with the first portion of water to the addition of the second portion of water. The second portion of water typically has a temperature of from 40 to 80° C.

After the addition of the second portion of water, the mixture of organic phase and aqueous phase can be passed into a calming zone for separation of the two phases and separated. This is expediently done in a horizontal, continuously operated phase separation vessel through which flow takes place with a low flow rate. Owing to the difference between the densities of the phases, the mixture of the organic phase and aqueous phase separates under the action of gravity so that the two phases are present in continuous form and substantially free of foreign phases, as layers one on top of the other.

Whereas in general no problems at all are encountered when separating off the main amount of the aqueous phase, the organic phase often also contains dispersed water droplets which do not coalesce spontaneously. Complete phase separation on the basis of the density difference requires a very long residence time, with the result that economical removal of the final amounts of aqueous phase is not possible. In order to remove the dispersed droplets of the aqueous phase which are still present after the main amount of the aqueous phases has been separated off, the organic phase containing still dispersed water droplets is advantageously passed through an apparatus having coalescence-promoting internals, and the coalesced aqueous phase is separated from the organic phase. The coalescence-promoting internals are as a rule packings, coalescence surfaces or fine-pored internals.

The internals having coalescence surfaces are generally plate packets having corrugated or inclined surfaces on which dispersed droplets accummulate and initially form a film. If this film encloses the individual plate and is sufficiently thick, large drops of the dispersed phase form at the plate edge and fall down. They then form a layer which can be readily separated off mechanically. In the case of fine-pored internals, the inner structure of the internals forces the finely dispersed drops to come into contact with the internal surface, which drops then form a film and leave the hollow structure of the fine-pored internals in the form of combined larger drops.

Suitable packings are the packings usually used in distillation. Preferably, the organic phase containing dispersed droplets of the aqueous phase is passed through a bed of packings. Wetting of the large surface of the packing results in surface coalescence and simultaneously, as a result of drop movement, in drop-drop coalescence.

Coalescing filters in the form of filter cartridges which consist, for example, of polypropylene have proven particularly useful.

It has proven advantageous to mix the organic phase freed from the main amount of the aqueous phase with a third portion of water before the passage through the apparatus having coalescence-promoting internals. The third portion of water is, for example, from 0.5 to 10, in particular from 2 to 7, % by weight, based on the organic phase. The temperature of the third portion is not critical and is usually from 20 to 60° C.

The polymerization of isobutene can be carried out continuously or batchwise but is preferably effected continuously. Processes for continuous polymerization in the presence of a complex of boron trifluoride and at least one cocatalyst in a liquid organic phase are known per se. In a continuous process, a part of the reaction mixture formed in the polymerization reactor is discharged continuously. An amount of starting materials, in this case isobutene or isobutene-containing feed, which correspond to the discharge is fed continuously to the polymerization reactor. The ratio of the amount of substances present in the polymerization reactor to the amount which is discharged is determined by the circulation/feed ratio which, in the case of the continuous polymerization of isobutene to polyisobutene, is as a rule from 1 000:1 to 1:1, preferably from 500:1 to 5:1, in particular from 50:1 to 200:1. The average residence time of the isobutene to be polymerized in the polymerization reactor may be from five seconds to several hours. Residence times of from 1 to 30, in particular from 2 to 20, minutes are particularly preferred.

The polymerization of the isobutene is carried out in the conventional reactors, such as stirred kettles, tubular reactors, tube-bundle reactors and loop reactors, loop reactors, i.e. tubular reactors or tube-bundle reactors having the characteristics of a stirred kettle, being preferred. Tubular reactors having tube cross-sections which lead to turbulence in segments are particularly advantageous.

The polymerization is carried out at a reaction temperature of from −60 to −4° C., in particular from −25 to −5° C. The heat of polymerization is removed appropriately with the aid of a cooling apparatus. This may be operated, for example, with liquid ammonia as a coolant. Another possibility for removing the heat of polymerization is evaporative cooling. Here, the heat liberated is removed by partial evaporation of the reaction mixture, for example of the isobutene and/or other readily volatile components of the isobutene feed or of a readily volatile diluent. Isothermal conditions are preferably employed, i.e. the temperature of the liquid organic reaction phase in the polymerization reactor has a constant value and changes only slightly, if at all, during the operation of the reactor.

The concentration of the isobutene in the liqiud reaction phase is as a rule from 0.2 to 50, preferably from 0.5 to 20, % by weight, based on the liquid organic phase.

Suitable starting materials are both isobutene itself and isobutene-containing $C_4$-hydrocarbon streams, for example refined $C_4$ fractions, $C_4$ cuts from the dehydrogenation of isobutane and $C_4$ cuts from steam crackers or FCC crackers (fluid catalysed cracking), provided that they have been substantially freed from 1,3-butadiene contained therein. Suitable $C_4$-hydrocarbon streams contain, as a rule, less than 500 ppm, preferably less than 200 ppm, of butadiene. The presence of 1-butene and cis- and trans-2-butene is substantially uncritical. The isobutene concentration in the $C_4$-hydrocarbon streams is typically from 40 to 60% by weight. When $C_4$ cuts are used as starting material, the hydrocarbons other than isobutene play the role of an inert diluent, as explained below. The isobutene-containing feed may contain small amounts of contaminants, such as water, carboxylic acids or mineral acids, without there being any critical decreases in yield or selectivity. It is expedient to avoid an enrichment of these impurities by removing such pollutants from the isobutene-containing feed, for example by adsorption onto solid adsorbents, such as active carbon, molecular sieves or ion exchangers.

Owing to the high viscosity of polyisobutene, it is advantageous to carry out the polymerization in the presence of an inert diluent. The inert diluent used should be suitable for reducing the increase in the viscosity of the reaction solution, which is to be observed during the polymerization reaction, to such an extent that removal of the resulting heat of reaction can be ensured. Suitable diluents are those solvents or solvent mixtures which are inert to the reagents used. Suitable diluents are, for example, saturated hydrocarbons, such as butane, pentane, hexane, heptane or octane, e.g. n-hexane, isooctane or cyclopentane, halogenated hydrocarbons, such as methyl chloride, dichloromethane or trichloromethane, and mixtures of the abovementioned diluents, among which n-hexane is particularly preferred. Before they are used, the diluents are preferably freed from impurities, such as water, carboxylic acids or mineral acids, for example by adsorption onto solid adsorbents, such as active carbon, molecular sieves or ion exchangers.

Boron trifluoride is expediently used in the form of gaseous boron trifluoride, it being possible to use technical-grade boron trifluoride still containing small amounts of sulfur dioxide and $SiF_4$, but highly pure boron trifluoride having a purity of about 99.5% by weight is preferably used.

Suitable cocatalysts are as a rule oxygen-containing compounds which preferably contain at least one divalent oxygen atom. Suitable oxygen-containing compounds in addition to water are organic compounds of up to 30 carbon atoms. Examples of these are $C_1$–$C_{30}$-alkanols, $C_1$–$C_{30}$-cycloalkanols, $C_2$–$C_{10}$-diols, $C_1$–$C_{20}$-carboxylic acids, $C_4$–$C_{12}$-carboxylic anhydrides and $C_2$–$C_{20}$-dialkyl ethers. Preferred among these are monohydric alkanols of 1 to 20, in particular 1 to 4, carbon atoms, which, if required, can be used together with the $C_1$–$C_{20}$-dialkyl ethers. Particularly preferred cocatalysts are monohydric secondary $C_3$–$C_{20}$-alkanols. Examples are isopropanol, 2-butanol, sec-pentanol, sec-hexanol, sec-heptanol, sec-octanol and the like. 2-Butanol and in particular isopropanol are particularly preferably used.

The molar ratio of boron trifluoride to cocatalyst is preferably from 1:1 to 1:10, in particular from 1:1.1 to 1:5, particularly preferably from 1:1.2 to 1:2.5.

The concentration of the complex of boron trifluoride and cocatalyst in the reactor is as a rule from 0.01 to 1, in particular from 0.02 to 0.7, particularly preferably from 0.03 to 0.5, % by weight, based on the liquid organic phase.

After the desired degree of polymerization has been reached, a first portion of water is added, as described, to the organic phase which is substantially at the reaction temperature, and a second portion of water is then added to the emulsion obtained.

The isobutene polymer contains, as a rule, more than 60, in particular more than 80, mol % of terminal vinylidene groups. The dispersity $M_w/M_n$ is preferably not more than 1.8, in particular not more than 1.6.

The working-up of the organic phase freed from the aqueous phase, for isolation of the desired polyisobutene, is carried out in a conventional manner. The polyisobutene is freed, as a rule by distillation, from unconverted isobutene, inert diluent and any isobutene oligomers and is obtained as a distillation residue, for example as a bottom product of a distillation column.

The examples and comparative examples which follow illustrate the invention.

EXAMPLES

For the preparation of a polyisobutene, the procedure according to EP-A 628 575, example 1, was followed: The isobutene-containing feed used corresponded to the following composition:

| Isobutane | <1% by weight |
| n-Butane | <1% by weight |
| 1-Butene | <1% by weight |
| trans-2-butene | <1% by weight |
| cis-2-butene | <1% by weight |
| Isobutene | about 45% by weight |
| Hexane | about 54% by weight |
| Butadiene | <50 ppm |
| Water | about 2 ppm |

In the course of one hour, 6 000 g of the above feed was fed to the suction side of a loop reactor which was equipped with an integrated circulation pump whose tube diameter was 30 mm and whose volume was 1 000 ml. 1.6 times the molar amount, based on the boron trichloride (7.1 mmol/l), of isopropanol was added. The reactor was cooled so that the temperature in the reaction medium was −17° C. The average residence time of the reaction medium in the reactor was 6.6 minutes.

Thereafter, the reaction discharge was first mixed, with the aid of a nozzle, continuously and thoroughly with X g per hour of water at 90° C. and thus brought to a temperature of A° C. An average temperature of the reaction discharge/water mixture of B° C. was then reached in the reaction discharge/water mixture after about 12 hours by continuous addition of a further amount of Y g per hour of water at 60° C.

In a continuous 500 ml phase separation vessel, the aqueous phase was then separated from the organic phase and a third portion of water amounting to Z g per hour and having a temperature of 40° C. was added continuously to the latter, once again by means of a nozzle.

The mixture thus obtained was passed continuously through a 100 ml cartridge filter and a further 500 ml phase separation vessel, in which aqueous and organic phases were once again separated.

After the cartridge filter and the final phase separation described, the organic phase was completely clear.

Analyses of the reaction discharge treated in this manner were carried out for assessing the separation of fluorine from the reaction discharge.

Furthermore, those analytical data of the polyisobutene obtained after removal of the volatile components by distillation which are relevant for assessing the product quality were determined and are listed below in the form of a table.

TABLE

| | A °C. | B °C. | X g/h | Y g/h | Z g/h | F ppm | Mn | D | Vin. % |
|---|---|---|---|---|---|---|---|---|---|
| Ex. | | | | | | | | | |
| 1 | 4 | 32 | 700 | 1700 | 0 | 38 | 2236 | 1.766 | 86.2 |
| 2 | 4 | 35 | 700 | 1900 | 0 | 37 | 2229 | 1.763 | 86.5 |
| 3 | 6 | 38 | 800 | 1900 | 0 | 34 | 2270 | 1.756 | 85.9 |
| 4 | 4 | 32 | 700 | 1700 | 50 | 26 | 2287 | 1.759 | 86.3 |
| 5 | 4 | 32 | 700 | 1700 | 100 | 21 | 2281 | 1.773 | 86.9 |
| 6 | 4 | 32 | 700 | 1700 | 150 | 17 | 2278 | 1.698 | 87.1 |
| Comp. Ex. | | | | | | | | | |
| 7 | 4 | 4 | 2600[1)] | 0 | 0 | 121[6)] | 2132 | 1.811 | 69.2 |
| 8 | −17 | 32 | 0 | 2600[2)] | 0 | 42 | 2118 | 1.809 | 82.3 |
| 9 | [5)] | 32 | 700[3)] | 1900[4)] | 0 | — | — | — | — | where
A = Temperature of the reaction discharge/water mixture after the first addition of water
B = Temperature of the reaction discharge/water mixture after the second addition of water
X = Amount of first addition of water
Y = Amount of second addition of water
Z = Amount of third addition of water
Mn = Number average molecular weight
D = Dispersity
Vin. = Vinylidene content
[1)]2600 g/h of water at 23° C.
[2)]2600 g/h of water at 54° C.
[3)]700 g/h of water at 50° C.
[4)]1900 g/h of water at 65° C.
[5)]The pipe between the first and second water metering became blocked with ice in the course of 4 hours. The plant could not be further operated at these feed rates and temperatures.
[6)]Substantial turbidity detectable in the organic phase.

We claim:

1. A process for the preparation of highly reactive polyisobutenes, in which
   a) isobutene is polymerized in the presence of a complex of boron trifluoride and at least one cocatalyst in a liquid organic phase at a reaction temperature of from −60 to −4° C.,
   b) the organic phase which is substantially at the reaction temperature is brought into intimate contact with a first portion of water whose temperature is at least 80° C. above the reaction temperature, with formation of an emulsion which contains finely dispersed water droplets in the organic phase,
   c) a second portion of water is added to the emulsion with formation of a continuous, predominantly organic phase and a continuous, predominantly aqueous phase, and
   d) the organic phase is separated from the aqueous phase.

2. A process as claimed in claim 1, in which the sum of the first and second portions of water is from 5 to 100% by weight, based on the weight of the organic phase, and the weight ratio of the first portion to the second portion is from 1:10 to 10:1.

3. A process as claimed in claim 1, in which the emulsion obtained by bringing the organic phase into contact with the first portion of water has a mixing temperature of from +5 to +50° C.

4. A process as claimed in claim 1, in which the cocatalyst used is a secondary alcohol of 3 to 20 carbon atoms.

5. A process as claimed in claim 1, in which polymerization is effected in step a) until polyisobutene molecules having a number average molecular weight of from 1 800 to 5 000 are obtained.

6. A process as claimed in claim 1, in which, in order to separate the organic phase from the aqueous phase, first the main amount of the aqueous phase is removed, the organic phase containing still dispersed water droplets is passed through an apparatus having coalescence-promoting internals and the coalesced aqueous phase is separated from the organic phase.

7. A process as claimed in claim 6, in which the organic phase freed from the main amount of the aqueous phase is mixed with a third portion of water before the passage through the apparatus having coalescence-promoting internals.

8. A process as claimed in claim 7, in which the third portion of water is from 0.5 to 10% by weight, based on the organic phase.

* * * * *